(12) United States Patent
Laycock et al.

(10) Patent No.: US 11,821,151 B2
(45) Date of Patent: Nov. 21, 2023

(54) ROAD CONSTRUCTION MATERIALS SPREADING VEHICLE

(71) Applicant: QFE HOLDINGS PTY. LTD., Melbourne (AU)

(72) Inventors: Graham Laycock, Gruyere (AU); Glenn Francis Hardiman, Hoddles Creek (AU); David Redfern Taylor, Wandin North (AU)

(73) Assignee: QFE HOLDINGS PTY. LTD., Melbourne (AU)

( * ) Notice: Subject to any disclaimer, the term of this patent is extended or adjusted under 35 U.S.C. 154(b) by 61 days.

(21) Appl. No.: 17/622,639

(22) PCT Filed: Jun. 24, 2020

(86) PCT No.: PCT/AU2020/050636
§ 371 (c)(1),
(2) Date: Dec. 23, 2021

(87) PCT Pub. No.: WO2020/257848
PCT Pub. Date: Dec. 30, 2020

(65) Prior Publication Data
US 2022/0267966 A1    Aug. 25, 2022

(30) Foreign Application Priority Data

Jun. 25, 2019 (AU) ................ 2019902203
Oct. 9, 2019 (AU) ................ 2019903796
May 8, 2020 (AU) ................ 2020901486

(51) Int. Cl.
*E01C 19/20* (2006.01)
*E01C 19/10* (2006.01)

(52) U.S. Cl.
CPC ...... *E01C 19/2045* (2013.01); *E01C 19/1063* (2013.01); *E01C 2019/2075* (2013.01)

(58) Field of Classification Search
CPC .. E01C 19/2045; E01C 19/1063; E01C 19/20; E01C 2019/2075; E01C 19/2005;
(Continued)

(56) References Cited

U.S. PATENT DOCUMENTS 4,200,408 A    4/1980 Babler et al.
4,405,089 A *  9/1983 Taylor ................ E01C 19/2005
                                                     414/523
(Continued)

FOREIGN PATENT DOCUMENTS

CN      204222950        3/2015
DE   102007042599 A1     3/2009
(Continued)

OTHER PUBLICATIONS

International Search Report for PCT/AU2020/050636 dated Aug. 26, 2020, 4 pages.
(Continued)

*Primary Examiner* — Abigail A Risic
(74) *Attorney, Agent, or Firm* — NIXON & VANDERHYE

(57) ABSTRACT

When spreading aggregate material onto a layer of bitumen/wet bitumen, when forming a road surface, the aggregate is commonly spread from a truck in reverse, potentially causing accidents and injuries. Safety is improved by providing a spreading vehicle that can be driven in the direction in which it is spreading the aggregate material. This is achieved by providing a second driving cab and driver controls at a location that would normally be considered the rearward end of the vehicle. The second driver cab is above a conveyor system conveying aggregate material from a hopper of the vehicle to a spreader box. The second driver cab allows the vehicle to be driven in the direction it is spreading material, by a driver who is facing the direction of travel, and who can (Continued)

see if the vehicle is about to hit anything or run into a worker in the surrounding area.

28 Claims, 9 Drawing Sheets

(58) Field of Classification Search
CPC . E01C 19/201; E01C 19/2075; E01C 19/2085
See application file for complete search history.

(56) References Cited

U.S. PATENT DOCUMENTS

| | | | |
|---|---|---|---|
| 10,195,976 B1* | 2/2019 | Null | E01H 10/007 |
| 10,273,640 B1 | 4/2019 | Boston et al. | |
| 2004/0146354 A1* | 7/2004 | Goodwin | E01C 19/48 |
| | | | 404/108 |
| 2006/0002762 A1* | 1/2006 | Crampton | E01C 19/2005 |
| | | | 404/110 |
| 2007/0098498 A1* | 5/2007 | James | E01H 1/003 |
| | | | 404/101 |
| 2016/0102439 A1* | 4/2016 | Jorgensen | E01C 19/4873 |
| | | | 404/118 |
| 2016/0215459 A1* | 7/2016 | Cunningham | E01C 11/24 |
| 2016/0215460 A1* | 7/2016 | Pembleton | B05B 1/20 |
| 2016/0215461 A1* | 7/2016 | Hays | E01C 19/176 |
| 2021/0301477 A1* | 9/2021 | Thiesse | E01C 19/20 |
| 2022/0334551 A1* | 10/2022 | Sommer | E01C 23/088 |

FOREIGN PATENT DOCUMENTS

| | | |
|---|---|---|
| FR | 2528085 A1 | 12/1983 |
| FR | 2899909 A1 | 10/2007 |
| FR | 2927095 A1 | 8/2009 |
| GB | 2216094 A | 10/1989 |
| JP | 2004-76499 | 3/2004 |
| KR | 101771072 B1 | 8/2017 |
| WO | 2007/051289 | 5/2007 |

OTHER PUBLICATIONS

Written Opinion of the ISA for PCT/AU2020/050636 dated Aug. 26, 2020, 6 pages.
Office Action issued in European Patent Application No. 20830507.8 dated Aug. 1, 2023.

* cited by examiner

ROAD CONSTRUCTION MATERIALS SPREADING VEHICLE

CROSS-REFERENCE TO RELATED APPLICATIONS

This application is the U.S. national phase of International Application No. PCT/AU2020/050636 filed Jun. 24, 2020 which designated the U.S. and claims priority to AU Patent Application Nos. 2019902203 filed Jun. 25, 2019, 2019903796 filed Oct. 9, 2019, and 2020901486 filed May 8, 2020, the entire contents of each of which are hereby incorporated by reference.

BACKGROUND OF THE INVENTION

Field of the Invention

This invention relates to a road construction materials spreading vehicle, and in particular, but not exclusively to a road construction materials spreading vehicle for spreading aggregate stone onto wet bitumen during road surface construction.

Description of the Related Art

During the final stages of the construction of road surfaces, hot bitumen is typically sprayed onto a compacted base layer of aggregated stone to form a layer on the stone, and a top layer of aggregate stone is immediately applied to the hot and still liquid layer of bitumen. This process usually involves a coordinated procedure in which two trucks work in tandem, a first truck laying down the hot bitumen, and a second truck following immediately behind to lay the aggregate stone on top.

The second truck cannot drive over the liquid bitumen however, and for this reason, the process has traditionally required the second truck to lay the top layer of aggregate stone whilst backing. In this way, the wheels of the truck are able to travel over the top layer of aggregate stone that has just been laid and are largely kept out of the liquid bitumen.

However, this backing procedure, in which large trucks are frequently backing with tipper bodies lifted high is potentially hazardous for a number of reasons. The truck may travel off-line and is prone to tipping or rolling if it goes over the edge of the built up pavement. The tipper body may contact power-lines or other overhead obstacles that are not immediately visible to the driver. In Australia there have been instances where spreading trucks have in fact rolled over or contacted power-lines in these situations.

The most significant hazard however, is the possibility of driving over another road worker. The process of laying aggregate stone onto a layer of freshly laid bitumen requires precision driving to ensure that the stones are applied accurately so that full coverage of the newly laid strip of bitumen is achieved. For this reason, a guide will often walk adjacent to the back of the truck, near to the falling curtain of stone, to assist the driver by confirming that the stone is falling correctly, and to guide the line being travelled by the spreading truck. There have been instances of this guide being injured by the truck as it reverses, as the truck driver has limited visibility of people working near the back of their truck. Unfortunately the injuries have sometime been fatal.

In recent times, alternative spreading truck designs have been developed and used. One such example is spreading truck that includes a conveyer system to transport the aggregate stone to the front of the vehicle and to spread the stone from a spreader box mounted forward of the cab of the truck. This design allows the spreader truck to spread the stone while travelling forward.

These modified trucks have a number of limitations however. The forward spreading system can overload the front axle of the truck, making steering difficult and making the vehicle unstable in certain circumstances. The additional length of the vehicle can also make turning difficult.

When paving a road surface, it is not uncommon that the vehicles carrying out the work need to turn and to travel back along the road that they are working on. In some cases, for example along expressways, there are no side-road junctions or other wide spots for a large truck to turn. This can result in spreading trucks having to travel long distances along a highway before they can double back to pick up a new load of stone.

In cases where trucks do attempt to turn around through 180 degrees on a newly formed road surface, or on a carefully prepared surface that is ready for sealing, the wheels of the truck can cause significant damage to the road surface.

What is needed is a new spreading truck design that will allow aggregate stone to be spread safely and accurately, but which does not significantly compromise the handling of the spreading vehicle, and which can minimise the need for sharp turning manoeuvres on newly formed road surfaces.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY OF THE INVENTION

It is therefore an object of the present invention to provide a road construction materials spreading vehicle which will at least go some way towards overcoming one or more of the above mentioned problems, or at least provide the public with a useful choice.

Accordingly, in a first aspect, the invention may broadly be said to consist in a road construction materials spreading vehicle, the spreading vehicle having a front end and a rearward end, and having a hopper configured to hold road construction materials, a spreader box situated at or adjacent the rearward end of the spreading vehicle and configured to evenly apply the road construction materials along a roadway; and wherein the spreading vehicle includes a first set of driving controls situated at or adjacent the front end of the vehicle and a second set of driving controls situated at or adjacent the rearward end of the vehicle.

Preferably the spreading vehicle further includes a side shift mechanism configured to move the spreader box laterally with respect to a chassis of the spreading vehicle.

Preferably the spreader box is movable between a lowered position and a raised position.

Preferably the spreader box is supported on a lifting mechanism that is configured to raise and lower the spreader box relative to the spreading vehicle.

Preferably the lifting mechanism includes a plurality of swing arms which facilitate and guide the raising and lowering of the spreader box relative to the spreading vehicle.

Preferably the spreading vehicle includes a side shift mechanism configured to move the spreader box laterally with respect to a chassis of the spreading vehicle, and a lifting mechanism that is configured to raise and lower the spreader box relative to the spreading vehicle.

Preferably the spreading vehicle further includes a conveyor system configured to transfer road construction materials from the hopper and into the spreader box.

Preferably the conveyor system includes at least one conveyor belt or a moving floor situated within or below the hopper.

Preferably the first set of driving controls is situated within a forward cab of the spreading vehicle.

Preferably the second set of driving controls is situated within a rearward driving module.

Preferably the rearward driving module is situated above a rearward end of the conveyor system.

Preferably the hopper is configured to fit within the space between the forward cab and the rearward driving module Preferably the conveyor system is situated upon two longitudinal chassis members of the spreading vehicle.

Preferably the rearward driving module is supported upon two spacer members that are attached to the rearward end of the structure of the conveyor system.

Preferably road construction materials are conveyed from the hopper and through a space below a floor of the rearward driving module and to the spreader box by the conveyor system when in use.

Preferably the spreading vehicle includes at least one walkway situated at a rearward end of the vehicle's chassis and configured to provide safe access into the rearward driving module.

Preferably the or each walkway includes a mesh style walking surface, allowing visual access from the rearward driving module to the ground below the rearward end of the vehicle's chassis.

Preferably the rearward driving module includes a driver's seat.

Preferably the rearward driving module is configured to enable a driver situated within the rearward driving module to observe a flow of material from the spreader box.

Preferably the rearward driving module is configured to hold a driver securely to minimise the possibility of a driver falling from the vehicle.

Preferably the rearward driving module includes a left driver station and a right driver station.

Preferably the rearward driving module includes a fully enclosed housing having windows allowing visibility in a rearward-wards direction.

Preferably the fully enclosed housing is in the form of a rearward facing cab of the vehicle.

Preferably the rearward facing cab includes one or more windows adjacent to a floor of the rearward facing cab that are configured to provide visibility of each end of the spreader box to a driver seated within the rearward facing cab.

Preferably the second set of driving controls includes at least one driving wheel or joystick configured to provide steering control for the spreading vehicle.

Preferably the vehicle includes driver's mirrors situated adjacent the rearward driving module, a left driver's mirror to the left of the rearward driving module, and a right driver's mirror to the right of the rearward driving module, providing visibility of the front steering wheels of the vehicle.

Preferably the second set of driving controls is connected electronically to the control systems of the vehicle.

In a second aspect, the invention may broadly be said to consist in a method of forming a bitumen sealed road surface at a road construction site using a road construction materials spreading vehicle substantially as described herein, the method including the steps of;

driving the vehicle to the road construction site with a load of aggregate stone using the first set of driving controls situated at the front of the vehicle, positioning the vehicle at the start of new section of bitumen to be laid at the road construction site using the first set of driving controls or the second set of driving controls, applying the aggregate stone to a freshly laid section of bitumen whilst driving the vehicle using the second set of driving controls, and driving the vehicle away from the freshly laid section of bitumen using either the first set of driving controls or the second set of driving controls.

Preferably the step of driving away from the freshly laid section of bitumen involves driving in a direction opposite to the direction driven whilst applying the aggregate stone to the freshly laid section of bitumen.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

BRIEF DESCRIPTION OF THE DRAWINGS

Further aspects of the present invention will become apparent from the following description which is given by way of example only and with reference to the accompanying drawings in which.

DESCRIPTION OF THE PREFERRED EMBODIMENTS

First Example

With reference to FIGS. 1 to 6, a first example of a road construction materials spreading vehicle (11) according to the present invention will now be described. The road construction materials spreading vehicle (11) has been designed for use in spreading road aggregates onto freshly laid bitumen, to form the upper layer of bitumen sealed roads.

During the spreading of road aggregates onto freshly laid bitumen it is necessary to lay the aggregate down first before driving over the fresh bitumen. If this is not done, the tyres of the vehicle will become covered in wet bitumen and small stones. To achieve this requirement of laying down the aggregate onto the fresh bitumen before driving over it, in a safe manner, the road construction materials spreading vehicle (11) has a second set of driving controls (13) situated at a rearward end of the vehicle (11).

Figure 1:
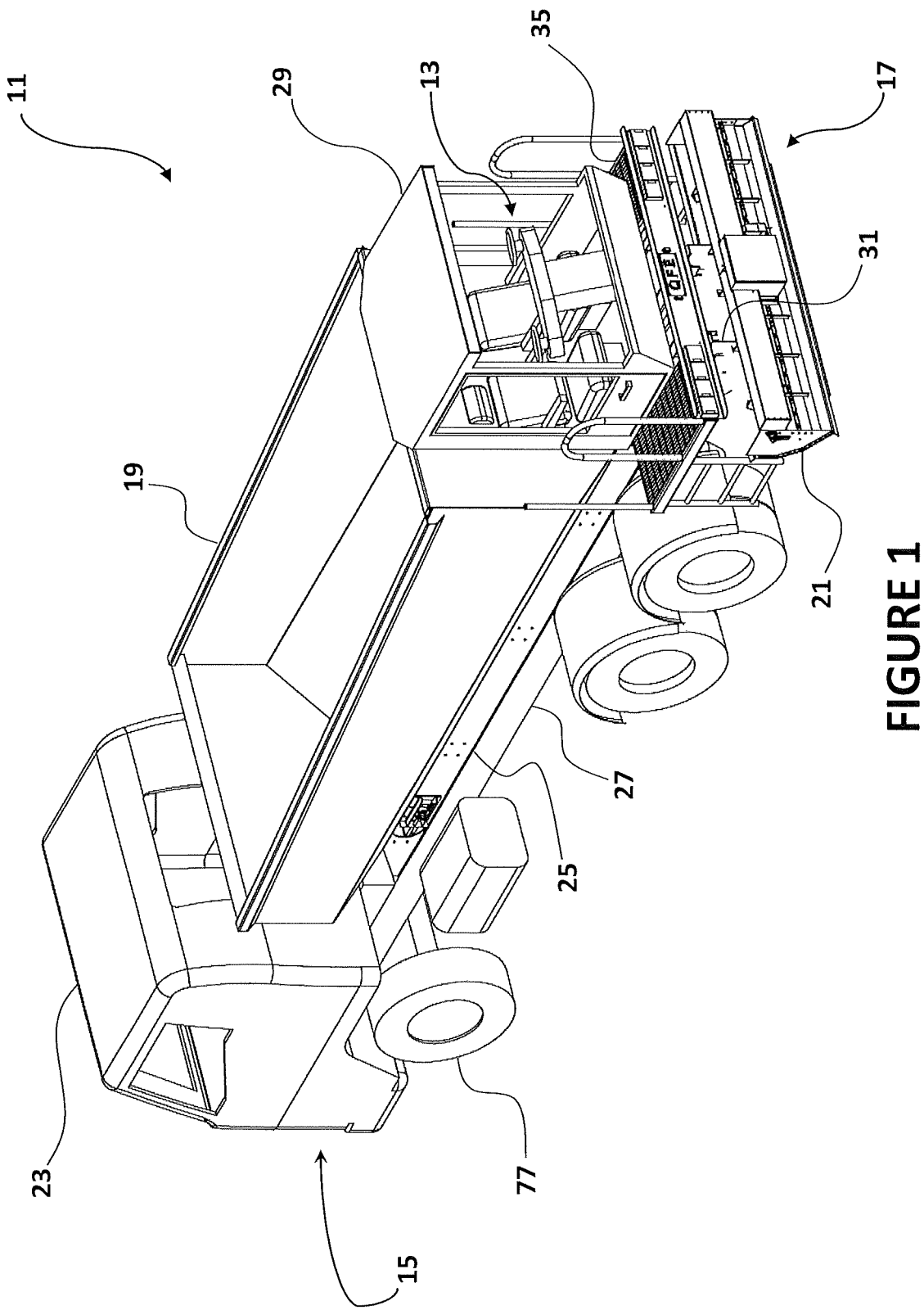
FIG. 1 is a perspective view of a first example of a road construction materials spreading vehicle according to the present invention.
Figure 2:
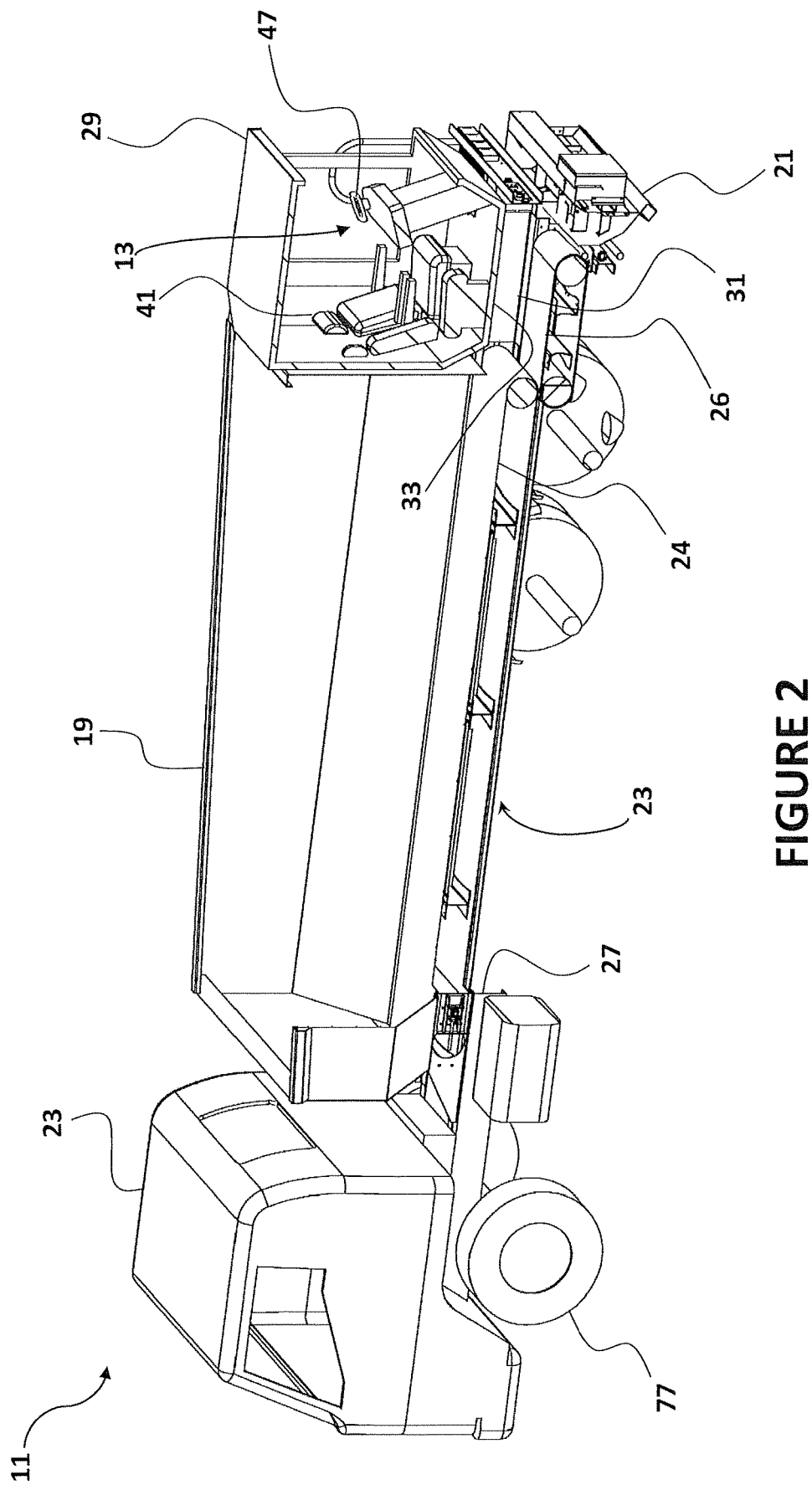
FIG. 2 is a partially cutaway perspective view of the first example of a spreading vehicle.
Figure 3:
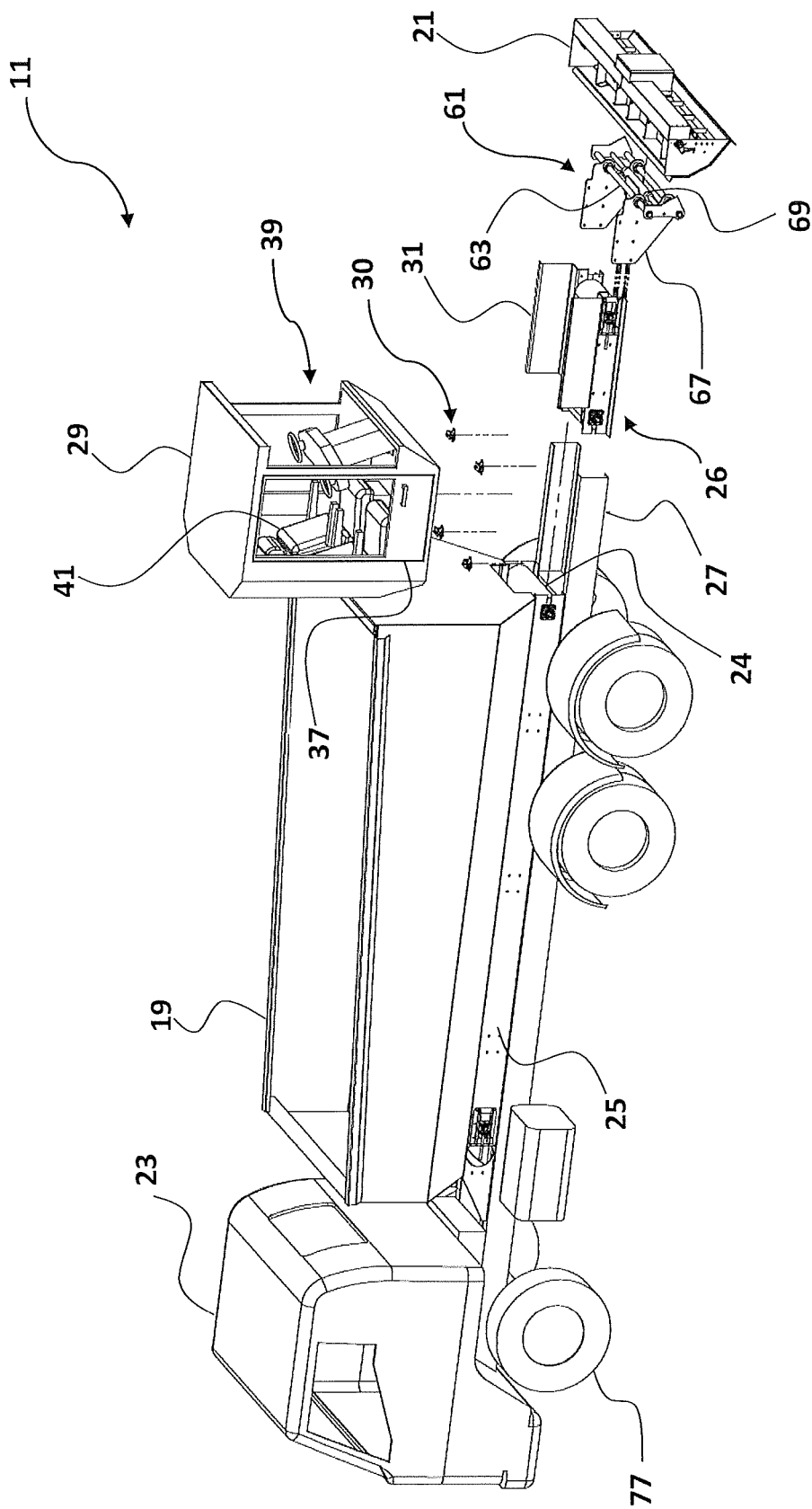
FIG. 3 is an exploded perspective view of the first example of a spreading vehicle.

In the FIGS. 1-3 it can be seen that the road construction materials spreading vehicle (11) has front end (15) and a rearward end (17). The spreading vehicle (11) also has a hopper (19) that is configured to hold road construction materials and a spreader box (21) situated at or adjacent the rearward end (17). The spreader box (21) is configured to evenly apply the road construction materials, or aggregate, along a roadway, and usually to evenly apply the road construction materials directly onto freshly applied wet bitumen.

The spreading vehicle (11) includes a first set of driving controls (not shown) situated at or adjacent the front end (15) and within a forward cab (22), and the second set of driving controls (13) is situated at or adjacent the rearward end (15) of the vehicle (11).

The spreading vehicle (11) also includes a conveyor system (23) that is configured to transfer road construction materials from the hopper (19) and into the spreader box (21). In this example, the conveyor system (23) includes a primary conveyor belt (24) or a moving floor that is situated at the bottom of the hopper (19). The primary conveyor belt (24) and the belt rollers are supported and run within a long and slender box structure (25) having a "U" shaped cross section, and which extends from the front end of the hopper (19) to the spreader box (21).

The entire conveyor system (23) runs from the forward end of the hopper (19) to the spreader box (21), and it is supported on two longitudinal chassis members (27) of the spreading vehicle (11). A base of the box structure (25) of the primary conveyor belt (24) is approximately level with a top of the two longitudinal chassis members (27). The primary conveyor belt (24) carries the aggregate to the rearward end of the hopper (19) and from this point the aggregate is dropped a short distance onto a secondary conveyor belt (26) which feeds the aggregate into the spreader box (21).

The secondary conveyor belt (26) is situated between a rearward end of the two longitudinal chassis members (27), and a top of the secondary conveyor belt (26) is approximately level with a top of the chassis members (27).

In the Figures it can be seen that the second set of driving controls (13) is situated within a rearward driving module (29). The rearward driving module (29) is situated above the secondary conveyor belt (26) and is supported on vibration dampers (30) attached to a top edge of two spacer members (31). One spacer member (31) is attached to each side of the vehicle's chassis. The spacer members (31) each comprise a short length of 'C' section rolled steel having a web height of approximately 150 to 200 millimetres. In this way, the rearward driving module (29) is supported a short distance above the secondary conveyor belt (26) by the two spacer members (31) and the dampers (30).

The hopper (19) is configured to fit within the space between the forward cab (22) and the rearward driving module (29). When the spreading vehicle (11) is in use, the road construction materials, or aggregates, are conveyed from the hopper (19) and through a space below a floor (33) of the rearward driving module (29). And rearwarder passing through the space below the floor (33) the aggregates are conveyed into the spreader box (21) by the conveyor system (23). The space above the secondary conveyor belt (26) and below the floor (33) is created by the spacer members (31).

The spreading vehicle (11) includes two walkways (35) that are situated at a rearward end of the vehicle's chassis, with one walkway (35) on each side of the rearward driving module (29). The walkways (35) each extend lengthwise from a rearward end of the hopper (19) to a location immediately above the spreader box (21). The two walkways (35) are configured to provide safe access into the rearward driving module (29). Each walkway (35) includes a mesh style walking surface, allowing visual access from the rearward driving module (29) to the ground below the rearward end of the vehicle's chassis.

The rearward driving module (29) includes a fully enclosed housing having doors (37) and windows (39) (glass not shown) allowing visibility in a rearward-wards direction, and to each side. The fully enclosed housing is in the form of a rearward facing cab of the vehicle (11). The rearward driving module or cab (29) is configured to hold a driver securely to minimise the possibility of a driver falling from the vehicle, and to assist achieving this goal the rearward driving module (29) includes a driver's seat (41).

Figure 4:
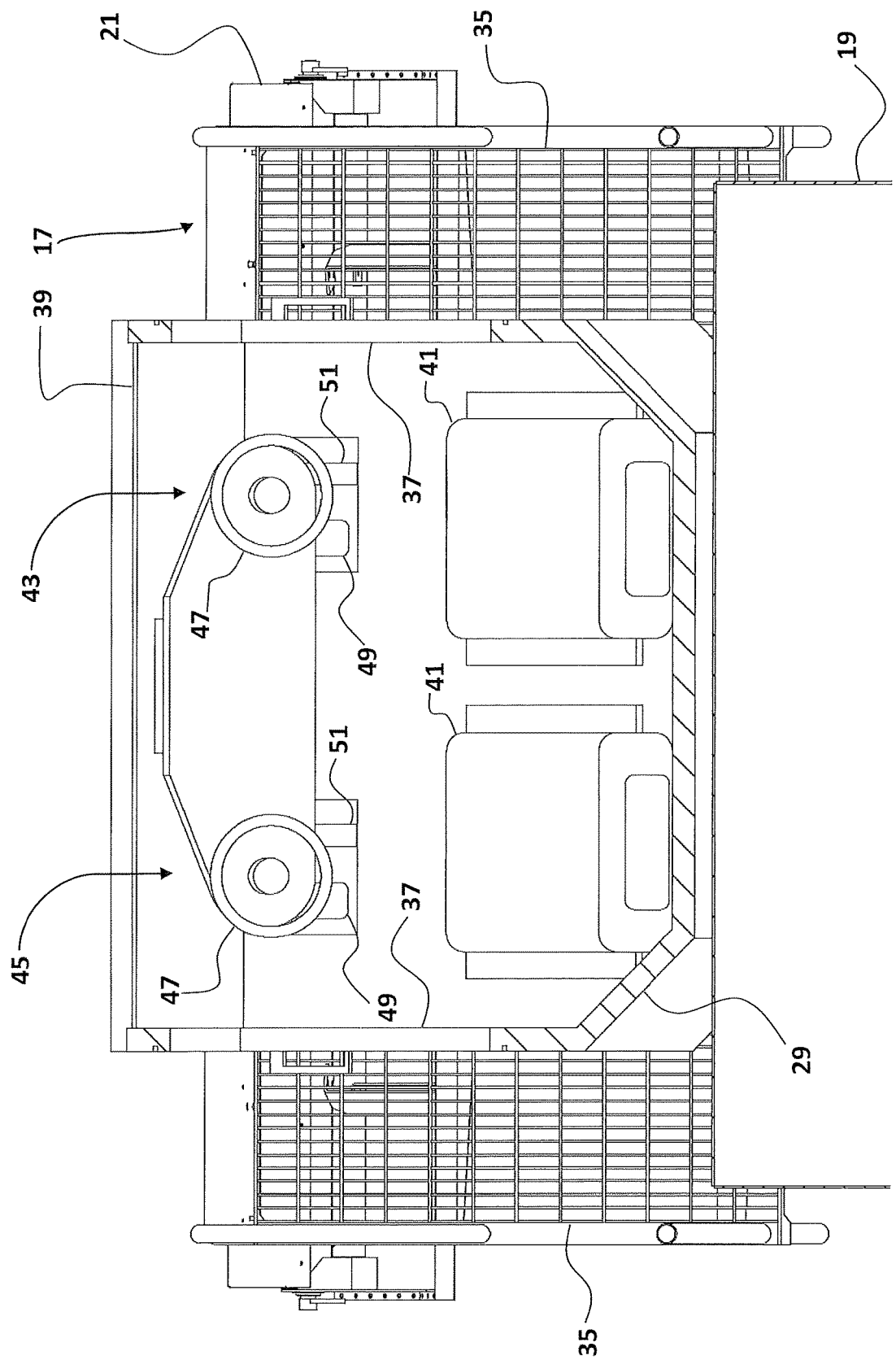
FIG. 4 is a cross sectional plan view of a rearward driving module of the first example of a spreading vehicle.

It can be seen in FIGS. 1 and 4 that the second set of driving controls (13) includes a left driver station (43) and a right driver station (45). Each driver station (43) or (45) includes a steering wheel (47) for direction control, an accelerator pedal (49) for acceleration control, and a brake pedal (51) for braking control. The steering wheels (47), the accelerator pedals (49) and the brake pedals (51) are all connected electronically to the control systems of the spreading vehicle (11). There is a driver's seat (41) at both driver stations (43) and (45). Each driver station (43) or (45) allows the vehicle (11) to be driven in a controlled and safe manner in the direction that a driver seating in either driver station (43) or (45) is facing.

The two driver stations (43) and (45) of the second set of driving controls (13) allow the driver to be positioned adjacent the door (37) on either side of the cab (29). This allows the driver to be situated on either side of the vehicle (11) so that the driver can be situated in the best position to guide the vehicle (11). For example, the vehicle (11) may be laying aggregate onto bitumen beside a concrete gutter at the road edge and it may be necessary to guide the vehicle (11) very accurately with respect the gutter. In such situations it is advantageous if the driver can be positioned on the appropriate side of the cab (29) whilst driving the vehicle (11) to help achieve the required accuracy.

Some of the windows (39) extend toward, or are situated adjacent to, the floor (33) of the cab (29). In this way, the windows (39) are configured to provide visibility of each end of the spreader box (21) to a driver seated within the cab (29). From the cab (29) the driver is also able to observe a flow of aggregate material from the spreader box (21). In this way, the driver is able to accurately control the direction and movement of the spreader vehicle (11) so that the aggregate is placed accurately onto a layer of freshly applied bitumen. Most importantly, the driver is able to do this without the need for an observer situated on the ground who could inadvertently be run over by the vehicle (11).

Figure 6:
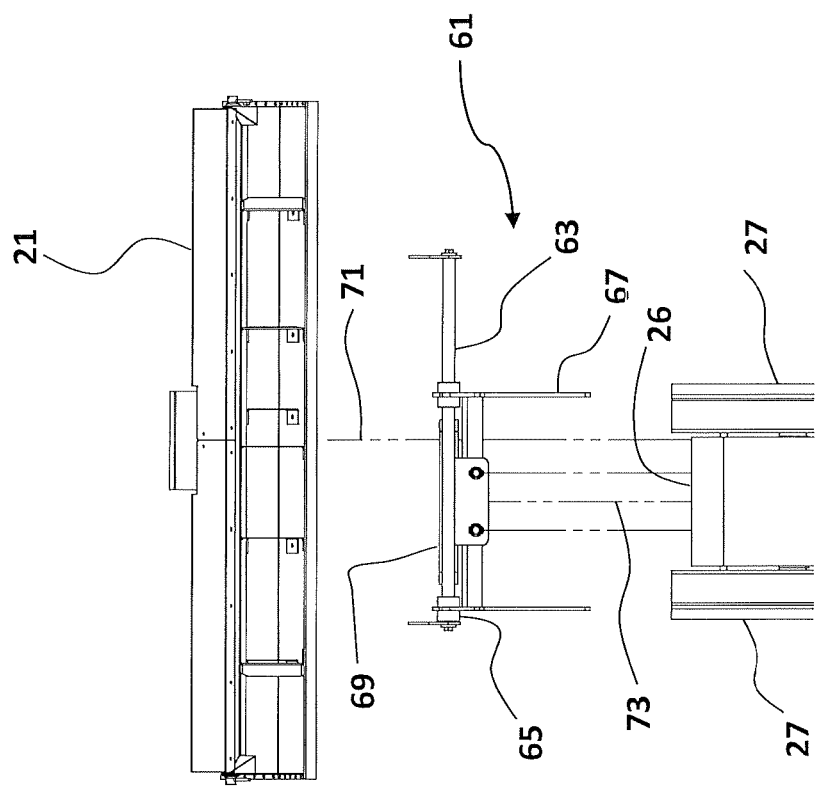
FIG. 6 is an exploded plan view of the spreader box side shift mechanism shown extended to the left.
Figure 5:
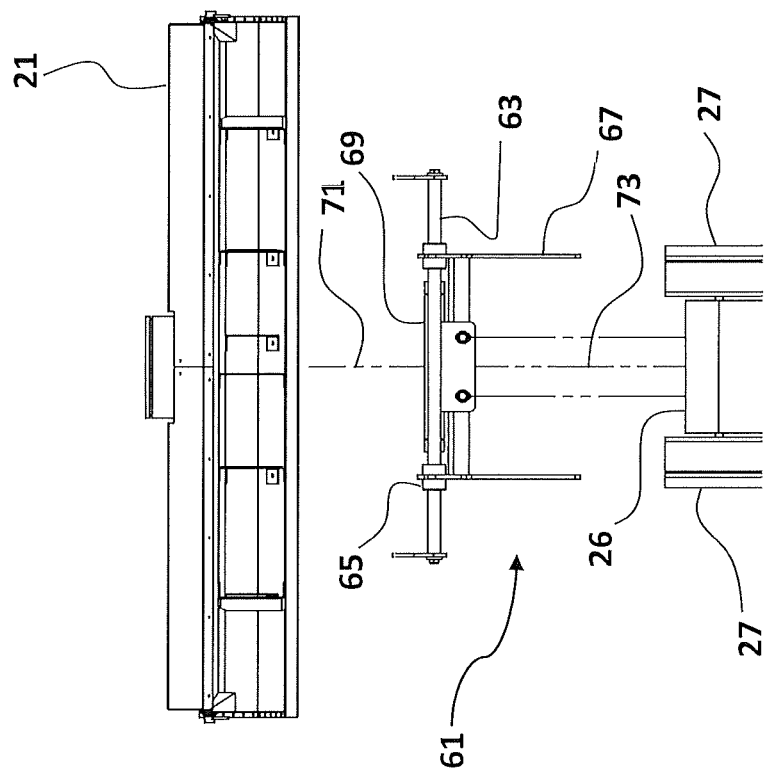
FIG. 5 is an exploded plan view showing a spreader box side shift mechanism of the first example of a spreading vehicle, shown in a centralised configuration.
Figure 7:
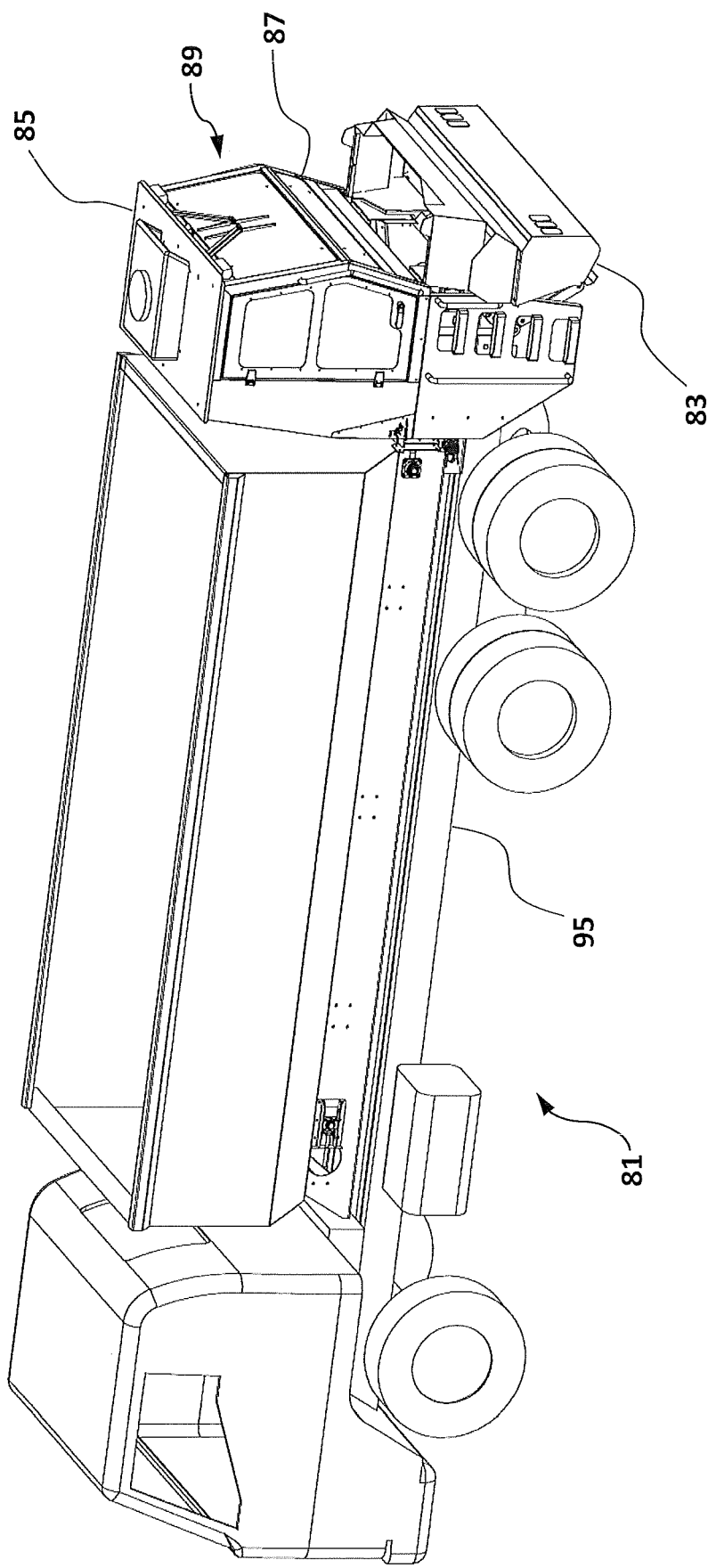
FIG. 7 is a perspective view of a second example of a road construction materials spreading vehicle according to the present invention.
Figure 8:
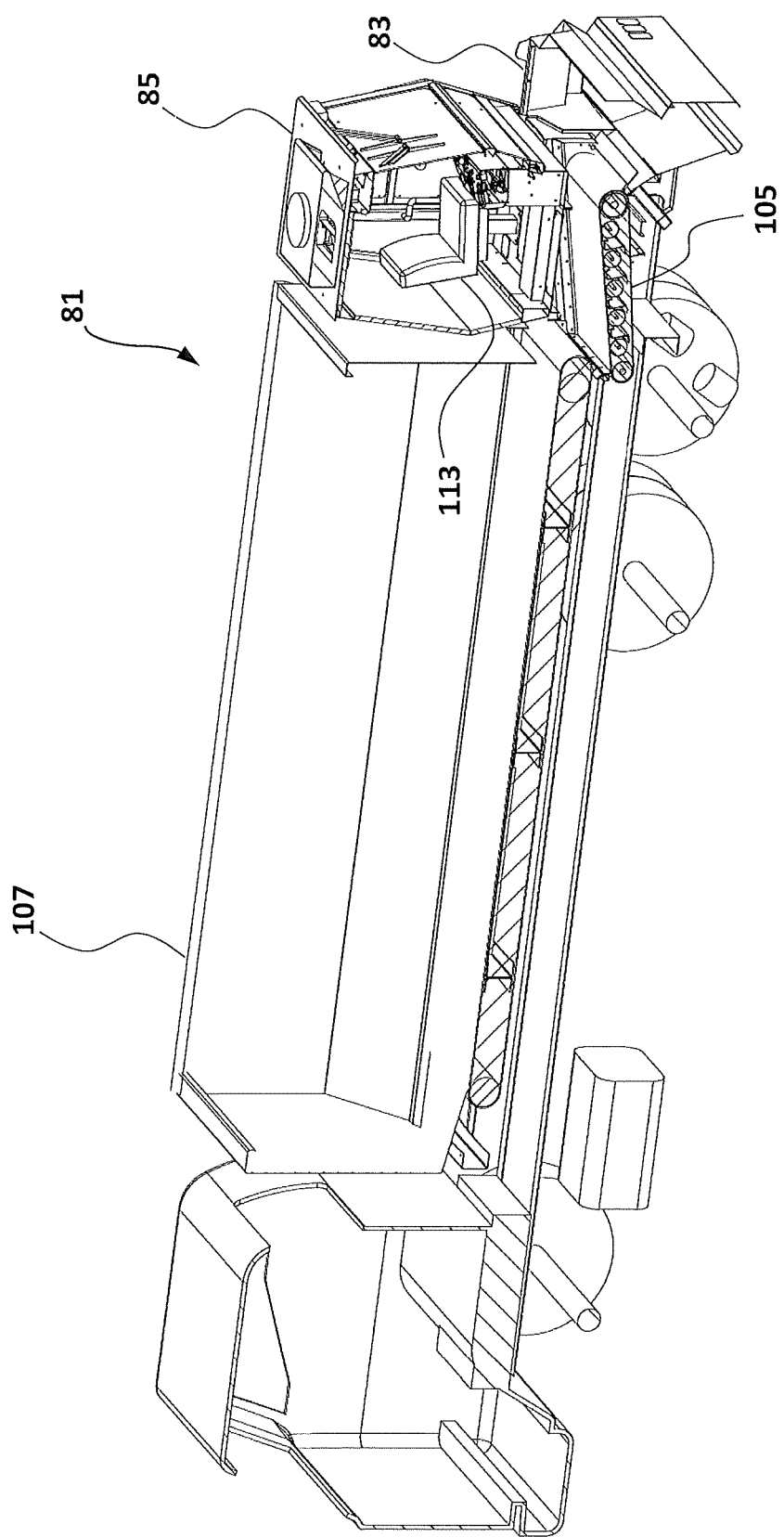
FIG. 8 is a partially cutaway perspective view of the second example of a spreading vehicle.

With reference to FIGS. 3, 5 and 6, it can be seen that the spreading vehicle (11) further includes a side shift mechanism (61). The side shift mechanism (61) is attached to a rearward end of the chassis members (27) and supports the spreader box (21), and the side shift mechanism (61) is configured to move the spreader box (21) laterally with respect to the chassis members (27). The side shift mechanism (61) includes two rods or rails (63) that slide longitudinally through guide bearings (65) that are mounted on support brackets (67). The support brackets (67) are attached to the rearward end of the chassis members (27).

The ends of the two rails (63) are attached to brackets extending from the spreader box (21). A linear actuator (69), for example a hydraulic ram, is used to move or position the spreader box (21) relative to the chassis members (27). In the example shown, the spreader box (21) can be moved approximately 250 millimetres to the left or the right from a centralised position. The centralised position is a position in which a midpoint (71) along the length of the spreader box (21) is aligned with a centreline (73) of the spreading vehicle (11).

The ability to reposition the spreader box (21) relative to the centreline (73) of the spreading vehicle (11) is particularly advantageous when the spreading vehicle (11) is being steered along a curved path, for example when following a corner in a road, whilst spreading aggregate onto wet bitumen. When spreading aggregate using the spreading vehicle (11) the driver is located adjacent to the rear wheels of the vehicle (11), and the steered wheels (77) are at the opposite end of the vehicle (11).

This means that the vehicle (11) acts like a rear wheel steered vehicle during aggregate spreading operations. The result is that when the vehicle (11) is steered towards one side, or in one direction, the steered wheels (77) will cause the front end (15) of the vehicle (11) to initially move toward the opposite side or direction. The ability to side-shift the spreader box (21) a little away from the direction of the turn helps to ensure that the steered wheels (77) continue to drive over spread aggregate. Without the ability to shift the spreader box (21) sideways, during turns the steered wheels (77) could end up driving over wet bitumen on the outside of the turn radius.

It should be noted that the rearward cab (29) also includes controls for the operation of the conveyor system (23), the spreader box (21) and the side shift mechanism (61). Whilst these controls have not been shown visually, any appropriate form of control can be used, whether the controls be in the form of hydraulic control valves, joysticks, electrical switches, etc.

Second Example

With reference to FIGS. 7 to 11, a second example of a road construction materials spreading vehicle (81) according to the present invention will now be described. The road construction materials spreading vehicle (81) is similar to the first example of a road construction materials spreading vehicle (11) described herein in many respects, and the main differences are outlined as follows.

The primary difference with the second example of a road construction materials spreading vehicle (81) is the ability to raise and lower the rearward mounted spreader box (83).

Figure 11:
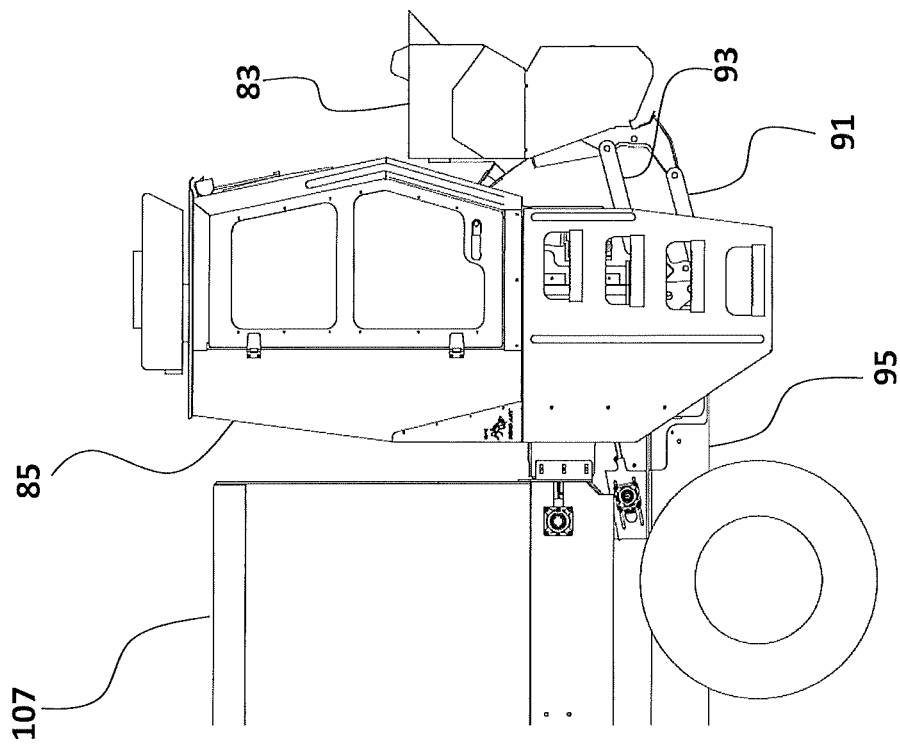
FIG. 11 is a side elevation view of the rearward driving module and spreader box of the second example of a spreading vehicle, with the spreader box in a raised configuration.
Figure 10:
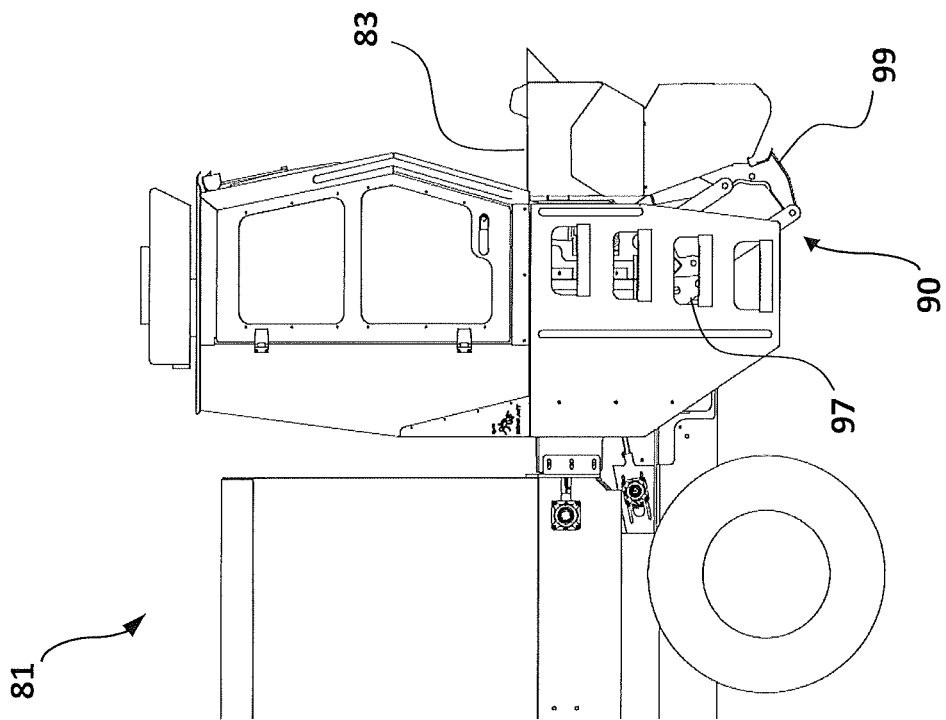
FIG. 10 is a side elevation view of the rearward driving module and spreader box of the second example of a spreading vehicle, with the spreader box in a lowered configuration.

The spreader box (83) is movable between a lower position and an upper position. The lower and upper positions of the movable spreader box (83) are shown in FIGS. 10 and 11 respectively. Instead of being positioned directly under a rearward driving module (85), as in the first example, when the spreader box (83) is in its lowered position, it is positioned below and generally rearward of the rearward driving module (85). And when the spreader box (83) is in its raised position, it is positioned further rearward and the upper half of the spreader box (83) is situated adjacent to a lower window panel (87) of the rearward face (89) of the rearward driving module (85).

As can be seen in FIGS. 10 and 11, the movable spreader box (83) is supported on a lifting mechanism (90) that is configured to raise and lower the spreader box (83) relative to the spreading vehicle (81). The lifting mechanism (90) includes two pairs of swing arms; an upper pair of swing arms (91) and a lower pair of swing arms (93). Both the upper pair of swing arms (91) and the lower pair of swing arms (93) are pivotally connected at their forward ends to mounting brackets (97) that are attached to a rearward end of each main chassis member (95). And the upper pair of swing arms (91) and the lower pair of swing arms (93) are pivotally connected at their rearward ends to support brackets (99) of the spreader box (83). In this way each pair of upper and lower swing arms (91) and (93) form a parallel four-bar linkage system which allows the movable spreader box (83) to move up and down, while maintaining a substantially upright or vertical orientation.

The path of the spreader box (83) from the upper position to the lower position is a path that is generally in a downwards and forward direction, which places a top part of the spreader box (83) adjacent the rearward end of the secondary conveyor belt (105) and ready to receive material via the secondary conveyor belt (105), when in the lower position. And conversely, the path from the lower position to the upper position is a path that is generally in an upwards and rearward direction, which places the spreader box (83) in a raised position well clear of the road for safer general highway travel and clear of a towing fitting of the vehicle.

The lifting mechanism (90) also includes one or more actuators configured to raise and lower the spreader box (83). In this case, two actuators (not shown) are used to raise and lower the spreader box (83), and the actuators are each hydraulic linear actuators. The cylinder of each actuator is connected to the mounting bracket (97), adjacent to the connection of each lower swing arm (93) to its respective mounting bracket (97). And the spear of each actuator is connected to the support brackets (99), the connections being adjacent to the connection of each upper swing arm (91) to its respective support bracket (99). In this way, the actuators form a diagonal brace of each parallel four-bar linkage system, and expansion of the actuators causes the spreader box (83) to move upwards.

This ability to raise and lower the spreader box (83) is advantageous in that it allows the spreader box (83) to be lowered to a suitable height for spreading aggregate onto wet bitumen, and at other times the spreader box (83) can be raised clear of a tow fitting, as noted earlier, to allow the vehicle (81) to be used for towing purposes. Optionally the spreader box (83) can be removed from the spreading vehicle (81), by unbolting the mounting brackets (97) from the chassis members (95), and disconnecting the hydraulic lines to the actuators. This ability to easily remove the spreader box (83) allows greater flexibility in the use of the vehicle (81).

Another difference with the second example of a road construction materials spreading vehicle (81) is the use of a rising secondary conveyor belt (105). The second conveyor belt (105) is inclined, rising as it extends rearward-wards, and in this orientation the second conveyor belt (105) lifts the construction materials from the hopper (107) before dropping them into the spreader box (83).

The relationship between the spreader box (83) and the rearward driving module (85), when the spreader box (83) is in its lowered position, provides line of sight from the rearward driving module (85) into the entire length of spreader box (83). This allows a person driving the vehicle (81) from the rearward driving module (85) to see if the spreader box (83) is operating as it should be.

Figure 9:
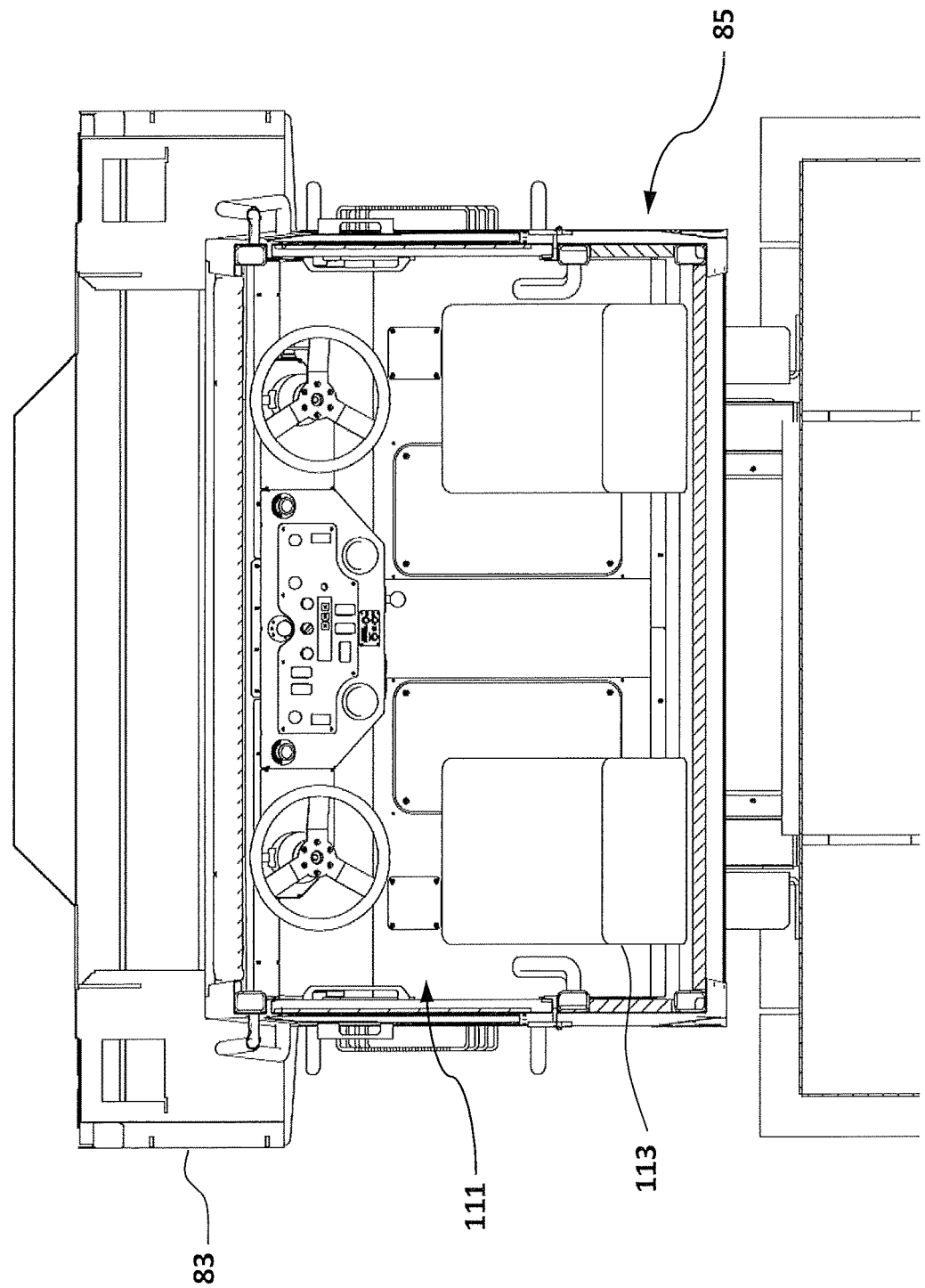
FIG. 9 is a cross sectional plan view of a rearward driving module and spreader box of the second example of a spreading vehicle.

FIG. 9 shows the second set of driving controls (111) within the rearward driving module (85). In this figure it can be seen that a person seated in either of the rearward driving seats (113) can look down onto the top of the full length of spreader box (83).

To further facilitate safe operation of the road construction materials spreading vehicle (81), brake lights and a reversing buzzer are fitted to the forward end of the vehicle. These items are only operational when the vehicle (81) is being operated from the rearward driving module (85).

Method

The spreading vehicles (11) and (81) described herein allow a new method of forming a bitumen sealed road surface to be used at a road construction site. The new method includes the steps of;

driving the vehicle (11) or (81) to the road construction site with a load of aggregate stone using the first set of driving controls situated at the front of the vehicle, positioning the vehicle (11) or (81) at the start of new section of bitumen to be laid at the road construction site using the first set of driving controls or the second set of driving controls (13) or (111), applying the aggregate stone to a freshly laid section of bitumen whilst driving the vehicle (11) or (81) using the second set of driving controls (13) or (111), and driving the vehicle (11) or (81) away from the freshly laid section of bitumen using either the first set of driving controls or the second set of driving controls (13) or (111).

This new method not only makes the application of the aggregate safer, it also gives the option of driving away from the freshly laid section of bitumen using the first set of driving controls which can eliminate any need to turn the vehicle (11) or (81). That is, the step of driving away from the freshly laid section of bitumen can involve driving in a direction opposite to the direction driven whilst applying the aggregate stone to the freshly laid section of bitumen.

This technique is useful in that spreader vehicles are typically operated on partially formed, or newly formed road surfaces, and turning the vehicles can damage the partly or newly formed surface. In the past, to avoid damaging the new road surface, spreader vehicles have sometimes had to drive long distances to exit a section of freeway to return to a stack site for reloading, when the next available off-ramp has been a long distance away.

Variations

Aspects of the present invention have been described by way of example only and it should be appreciated that modifications and additions may be made thereto without departing from the scope thereof.

In the examples described above, the second set of driving controls (13) or (111) includes two steering wheels (43). As an alternative to the steering wheels (43), one or two joysticks could be used, the joysticks being configured to provide steering control for the spreading vehicle (11) and optionally to provide acceleration control and braking control.

The vehicle (11) can also include driver's mirrors (not shown) situated to each side of the rearward driving module (29). A left driver's mirror situated to the left of the rearward driving module, and a right driver's mirror situated to the right of the rearward driving module would provide visibility of the steered wheels (77) of the vehicle (11) and help to improve the safety of operation.

In the first example the spreading vehicle (11) includes a side shift mechanism (61) which allows the spreader box (21) to be moved laterally. And in the second example, the spreading vehicle (81) includes a lifting mechanism (90) which allows the spreader box (83) to be raised and lowered. It is envisaged that in an alternative configuration, a combination of a side shift mechanism and a lifting mechanism could be used. For example, the upper and lower swing arms of a lifting mechanism could be attached to a side shift mechanism, so that the upper and lower swing arms could be moved from side to side to allow the spreader box to be moved both from side to side and up and down. Alternatively, the side shift mechanism could be situated between the swing arms and the spreader box to allow a similar function.

Definitions

Throughout this specification the word "comprise" and variations of that word, such as "comprises" and "comprising", are not intended to exclude other additives, components, integers or steps.

The terms "front", "back", "rearward", "left" and "right" used in the specification are locations on the vehicle, or directions, relative to a driver normally seated in the forward cab (22) of the vehicle.

Advantages

Thus it can be seen that at least the preferred form of the invention provides a road construction materials spreading vehicle which has one or more of the following advantages;

the vehicle can be driven from the rearward cab, and in the direction that the driver is facing, whilst spreading aggregate onto a road with the driver having full vision in the direction of travel, the aggregate can be laid accurately without the need for a guide person walking near an operating vehicle.

The spreader box can be moved sideways during turns to help minimise the possibility of the steered wheels rolling over wet bitumen, the vehicle is not overly long or poorly balanced or difficult to control, as with vehicles that include spreader boxes situated at the front of the vehicle, the vehicle does not need a tipping body, reducing the possibility of the vehicle tipping or contacting power lines, bridges, trees, etc., the vehicle allows the driver to be positioned at either side of the rearward cab, allowing an optimum viewing angle to be achieved, the need to turn the vehicle around, or to turn through 180 degrees, on a partly or newly formed road surface can be eliminated when it is required to return to a stack site for reloading, or the vehicle can be controlled during an aggregate spreading operation with greater accuracy and safety.

The invention claimed is:

1. A steerable road construction materials spreading vehicle, the spreading vehicle having a front end and a rearward end, and having a container configured to hold road construction materials, a spreader box situated at or adjacent the rearward end of the spreading vehicle and configured to apply the road construction materials along a road way; means to convey road construction materials from the container into the spreader box; and wherein the spreading vehicle includes a first set of driving controls situated at or adjacent the front end of the vehicle, the first set of driver controls being configured to control the steering and the driving of the vehicle; and a second set of driving controls situated at or adjacent the rearward end of the vehicle above the spreader box, the second set of driver controls being configured to control the steering and the driving of the vehicle; thereby allowing the vehicle to be steered from the second set of driving controls or steered from the first of driving controls with a driver in each case facing in the direction of travel.

2. The steerable road construction materials spreading vehicle as claimed in claim 1, wherein the spreader box extends across the width of the vehicle.

3. The steerable road construction materials spreading vehicle as claimed in claim 1, wherein each set of driving controls is situated in a driving module so that the vehicle has a forward driving module and a rearward driving module.

4. The steerable road construction materials spreading vehicle as claimed in claim 3, wherein the rearward driving module includes a left driving station and a right driving station.

5. The steerable road construction materials spreading vehicle as claimed in claim 2, wherein the container is an open topped container having front and rear walls and side walls and a lower part of the sidewalls slope towards the means to convey road construction materials from the container into the spreader box.

6. The steerable road construction materials spreading vehicle as claimed in 3, wherein the rearward driving module also includes controls for the spreader box.

7. The steerable road construction materials spreading vehicle as claimed in claim 1, wherein the spreading vehicle further includes a conveyor system configured to transfer road construction materials from the container and into the spreader box.

8. The steerable road construction materials spreading vehicle as claimed in claim 1, wherein the means to convey aggregate is a conveyor system including at least one conveyor belt or a moving floor situated within or below the container.

9. The steerable road construction materials spreading vehicle as claimed in claim 7, wherein the conveyor system is situated upon two longitudinal chassis members of the spreading truck.

10. The steerable road construction materials spreading vehicle as claimed in claim 1, wherein the means to convey aggregate comprises an auger.

11. The steerable road construction materials spreading vehicle as claimed in claim 1, wherein the means to convey aggregate comprises a pusher plate.

12. The steerable road construction materials spreading vehicle as claimed in claim 1, wherein the means to convey aggregate comprises a tipper body configured to deliver aggregate to the spreader box.

13. The steerable road construction materials spreading vehicle as claimed in claim 8, wherein the container is a hopper.

14. The steerable road construction materials spreading vehicle as claimed in claim 8, wherein road construction materials are conveyed from the container and through a space below a floor of the rearward driving module to the spreader box by the conveyor system when in use.

15. The steerable road construction materials spreading vehicle as claimed in claim 14, wherein the conveyor system includes a separate conveyor passing under the floor of the rearward driving module.

16. The steerable road construction materials spreading vehicle as claimed in claim 1, wherein the spreading vehicle includes at least one walkway situated at a rearward end of the vehicle and configured to provide safe access into the rearward driving module.

17. The steerable road construction materials spreading vehicle as claimed in claim 16, wherein the or each walkway includes a mesh style walking surface, allowing visual access from the rearward driving module to the ground below the rearward end of the vehicle.

18. The steerable road construction materials spreading vehicle as claimed in claim 4, wherein each of the left and right rearward driving stations includes at least one driver's seat.

19. The steerable road construction materials spreading vehicle as claimed in claim 18, wherein the rearward driving module is configured to enable a driver situated within the rearward driving module to observe a flow of material from the spreader box.

20. The steerable road construction materials spreading vehicle as claimed in claim 2, wherein the spreading vehicle further includes a side shift mechanism configured to move the spreader box laterally with respect to the spreading vehicle.

21. The steerable road construction materials spreading vehicle as claimed in claim 2, wherein the spreader box is movable between a lowered position and a raised position.

22. The steerable road construction materials spreading vehicle as claimed in claim 21, wherein the spreader box is supported on a lifting mechanism that is configured to raise and lower the spreader box relative to the spreading vehicle.

23. The steerable road construction materials spreading vehicle as claimed in claim 22, wherein the lifting mechanism includes a plurality of swing arms which facilitate and guide the raising and lowering of the spreader box relative to the spreading vehicle.

24. The steerable road construction materials spreading vehicle as claimed in claim 22, wherein the spreading vehicle also includes a side shift mechanism configured to move the spreader box laterally with respect to the spreading vehicle.

25. The steerable road construction materials spreading vehicle as claimed in claim 1, wherein the rearward driving module includes a fully enclosed housing having windows allowing visibility in a rearwards direction.

26. The steerable road construction materials spreading vehicle as claimed in claim 1, wherein the rearward driving module has an open safety cage allowing visibility in a rearwards direction.

27. A steerable road construction materials spreading vehicle capable of spreading aggregate stone when travelling in reverse, the spreading vehicle having a front end and a rearward end supported by at least front wheels and rear wheels, a first set of driving controls situated at or adjacent the front end of the vehicle allowing the vehicle to be driven/steered from the front of the vehicle and having a container suitable for containing aggregate stone for spreading onto a road way, a spreader box situated at or adjacent the rearward end of the spreading vehicle and spaced apart from the rear wheels and extending substantially across the width of the spreading vehicle and configured to apply the aggregate stone in advance of the vehicle's wheels when the vehicle is reversing so that the aggregate stone can be applied on top of freshly laid bitumen on a road way; means to convey the aggregate stone from the container into the spreader box; and wherein the spreading vehicle includes a second set of driving controls situated at or adjacent the rearward end of the vehicle above the spreader box, thereby allowing the vehicle to be driven/steered from the second set of driving controls when reversing with a driver at the second set of driving controls allowing the driver to look in the direction the vehicle is travelling and/or applying aggregate stone to freshly laid bitumen.

28. A method of forming a bitumen sealed road surface at a road construction site using a road construction materials spreading vehicle having a front driving module at the front of the vehicle and a rear driving module at the rear of the vehicle, the method including the steps of:

driving the vehicle to the road construction site with a load of aggregate stone using a first set of driving controls situated at the front of the vehicle, positioning the vehicle at the start of new section of bitumen to be laid at the road construction site using the first set of driving controls or a second set of driving controls in the rear driving module, applying bitumen to the section of the road surface using another vehicle, applying the aggregate stone to a freshly laid section of bitumen whilst driving the vehicle using the second set of driving controls, and driving the vehicle away from the freshly laid section of bitumen using either the first set of driving controls or the second set of driving controls.

* * * * *